Patented Mar. 23, 1943

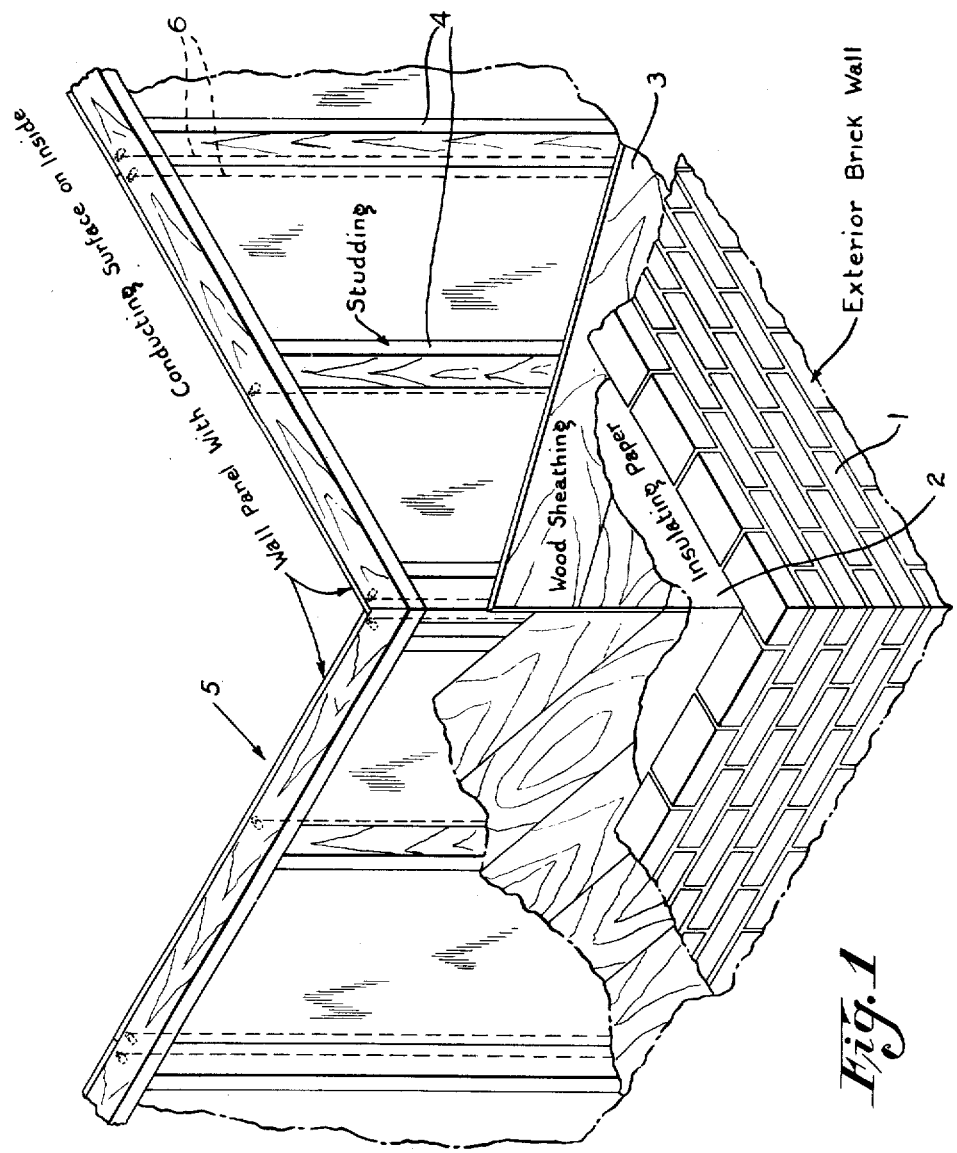

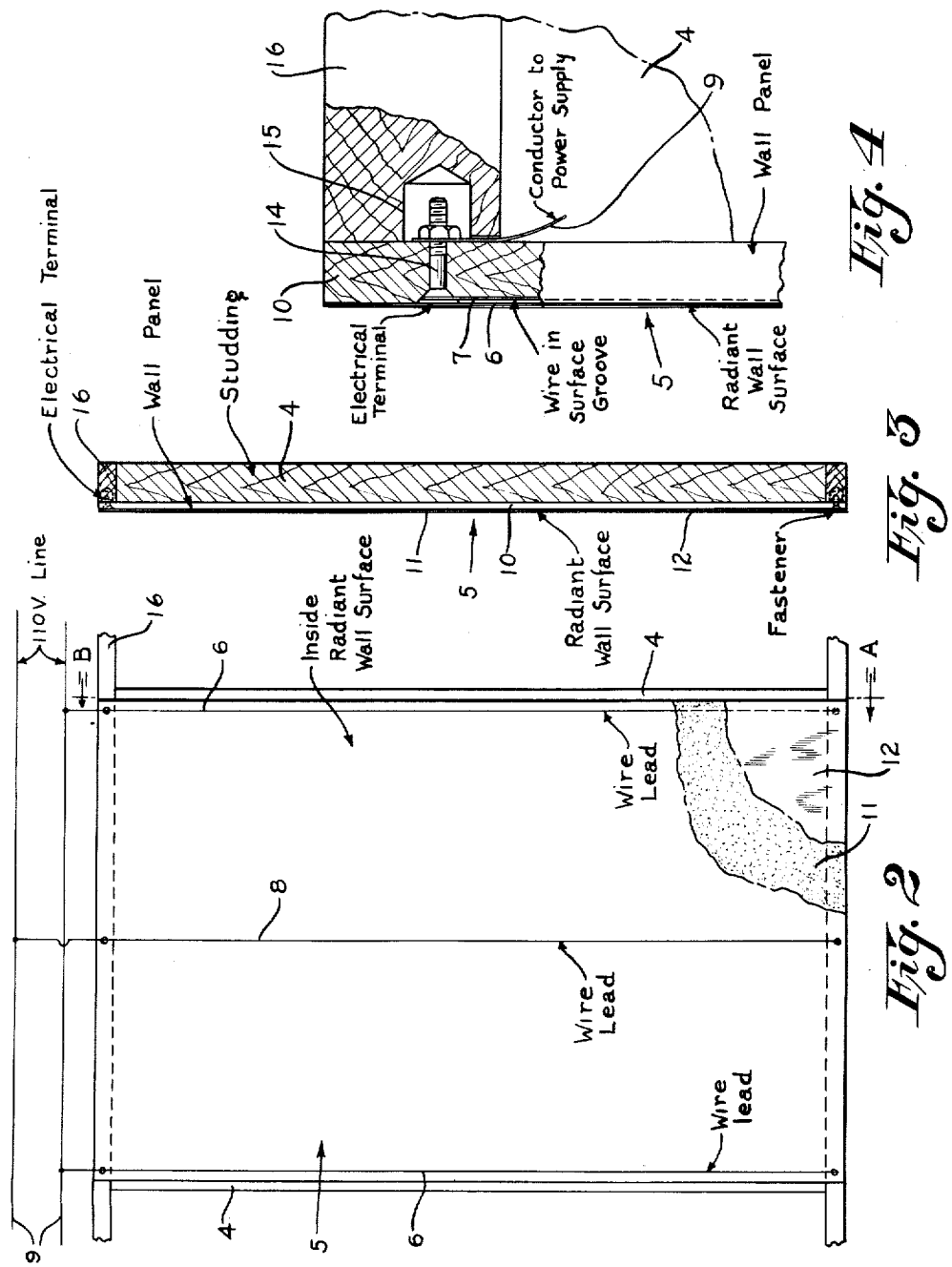

2,314,766

UNITED STATES PATENT OFFICE 2,314,766

SURFACE HEATING ELEMENT

Arthur W. Bull, Grosse Pointe, and Glenn G. Havens, Detroit, Mich., assignors to United States Rubber Company, New York, N. Y., a corporation of New Jersey Application April 17, 1940, Serial No. 330,054

10 Claims. (Cl. 219—19)

This invention relates to heating elements having electrically conducting surface layers and, more particularly, to an electrical heating element adapted for radiant heating.

Radiant heating is a recognized form of heating which is distinguished from the more customary type involving convection and conduction. For example, in the latter instance, as applied to the heating of a dwelling, the air is first heated and, due to its convection, it, in turn, heats the walls of the room and other objects within the room. In radiant heating, however, the heat leaves the wall in the form of radiant energy, and when it is incident upon objects or persons and is absorbed by them, it is reverted to the usual form of heat energy and manifests itself by an increase in the temperature of the absorbing body. The air in a room absorbs very little of the radiant energy passing through it.

Among the prior methods of employing radiant heating are: heating the interior surface of the walls by using hot water or steam pipes in the plaster or concrete; by installing hot water or steam pipes in the floor; by circulating warm air through ducts in the floor, walls, or ceiling; or by inserting electrically heated metal plates or wires in the walls. These methods, however, all take up considerable space and construction, involve high installation costs, and detract from the appearance of the room. Where electrical metal plates or a network of wires have been embedded in the walls and heated from an exterior electrical source, they are not permanent due to corrosion and breaking thereof and, also, the installation cost is excessive.

The purpose of this invention is to provide a means of heating that will satisfy a large number of demands, such as freedom from dirt, minimum degree of fire hazard, automatic heat control, inconspicuousness, minimum of space, low installation costs, etc. Accordingly, the invention comprises a heating element which is made up of a composition containing a non-metallic electrically conducting material and an electrical relatively non-conducting binder, which element is connected to a source of electrical energy by suitable electrical connections.

In the drawings,

Fig. 1 shows, in perspective and cross-section, an adaptation of such a heating device for the radiant heating of a room from the interior surface walls of a dwelling;

Fig. 2 shows a vertical view of the wall paneling which has been shown in Fig. 1, with the electrical connections;

Fig. 3 is a vertical cross-sectional view along section line A—B of Fig. 2; and

Fig. 4 is a detailed view, partly in section, showing how the electrical lead wire may be placed in the paneling and connected to an electrical terminal which leads to a source of electrical energy.

More briefly, the invention comprises the preparation of the referred-to heating element by coating or impregnating a film or layer of the electrically conducting composition over a support which preferably is a relatively non-inflammable, heat-insulating, non-conducting support, such as Celotex, Masonite, insulating sheetrock, plaster, plaster-board, etc., or a textile material such as suitably treated cotton, rayon, glass or asbestos cloth, etc.

Referring specifically to Fig. 1 of the drawings, we show a section of a common form of building to which the invention may be applied, and comprising an exterior brick wall 1, insulating paper sheet 2, a wood sheathing 3, and studding 4, to the interior of which is applied a series of heat radiating panels 5 embodying the present invention. Electrical conductors indicated by the numeral 6 are positioned in grooves 7 (Fig. 4) at the face of the panel 5 and are located near the vertical edges of the panel and parallel thereto. The conductors 6, in turn, are separated from the conductor 8 and connect with the wires of a different polarity in a supply circuit 9.

The metal wires 6 and 8, which distribute the electrical potential to the surface conducting film, are embedded into the groove 7 of the insulating wall structure 10. A layer of the conducting film is placed in the groove 7 before and after the wire is placed, thus insuring good electrical contact.

Referring particularly to Fig. 3, each panel 5 comprises a base 10 of suitable non-conducting material of any one of the types herein described. A layer 11 of heat generating rubber composition is applied thereto to form a radiant wall surface and, if desired, a further layer 12 of electrically non-conducting paint is applied to layer 11.

Referring specifically to Fig. 4, we show in detail a means for forming an electrical connection between the front and rear surfaces of the panel 10 which is provided in the form of a bolt 14 having a counter-sunk face extending through the panel 10 near the corners thereof and engaging the conductors 6 or 8 at the surface of the panel, and connecting with the principal circuit 9 at the opposite end of the bolt 14. A recess 15 may be provided in a plate member 16, forming with the studding 4 the principal framework, for the purpose of facilitating clearance of the nut end of the bolt 14.

In assembling the wires 6 or 8, the wire is pulled taut and it has been found convenient to bolt it in position by soldering it to the head of the counter-sunk bolt 14. These bolts may be placed in several positions along the length of the wire. Preferably, the wire used is a flexible, tinned wire.

While this invention relates to radiant heating primarily, it is understood that the other forms of heating, that is, by conduction and by convection, may be involved to some extent, since contact with the heated surface may be made by solid bodies or atmosphere such as air.

Various methods may be used in applying the conducting layer or film 11 to the non-conducting support 10. It may be dipped or brushed, or it may be allowed to flow over the surface. All such methods are controlled so that the film thickness is uniform. A representative film composition which has been found satisfactory is as follows:

| | |
|---|---|
| Rubber | 100 |
| Conducting carbon black | 85 |
| Zinc oxide | 15 |
| Antioxidant | .75 |
| Accelerator | 2.00 |
| Deodorant | .10 |
| Softener | 7.00 |
| Vulcanizing agent | .75 |

In order to obtain uniform heating, the film or layer 11 should be of relatively uniform thickness, preferably between 0.0001 and 0.01 inch, so as to obtain uniform surface temperatures, and should suitably contact throughout a substantial length of the coating with the metal conductor wires 6 and 8, so as to complete an electrical circuit, whereby electrical energy reaches the coating composition 11 for conversion into heat energy.

The coating composition 11 is preferably made by stirring a finely divided electrically conducting black into rubber cement containing rubber dissolved in an organic solvent such as benzene, gasoline, etc. We find that good results are obtained by adding conducting black in the amount of 25 per cent. to 50 per cent. by weight (based on weight of the dried composition). More particularly, the invention contemplates the use of a carbon black which per se has an electrical resistivity of not more than about 0.25 ohm-centimeter when compressed at 2500 pounds per square inch. The cement may be uncured or curable, and the composition may contain any desired vulcanizing and accelerating ingredients. The purpose of the rubber is to furnish a flexible binder for the conducting black. Cements made by the preferred method have resistivities less than 1 ohm-centimeter and preferably between 0.1 and 1.0 ohm-centimeter.

In some cases it may be desired to replace the rubber in whole or in part by other flexible binders; for example, artificial rubbers such as Buna, Neoprene, Thiokol, and various natural or artificial resins or plastics such as shellac, cellulose acetate, viscose, Nylon, Vinylite, casein, etc. Various of these materials (having the black processed in them) may be used in the form of varnishes and paints. It has been found that thermal acetylene black has the desired electrical resistivity, although other carbon blacks may be treated so as to furnish the desired electrical resistivity. For example, it is possible to make regular carbon black more conducting by heating it in an inert atmosphere at 2000 degrees Fahrenheit.

The black may also be mixed with the binder on a mill or other mixing device or in the case of latices such as rubber latex (naturally or artificially prepared), the black may be stirred into the latex, and the latex composition applied to the support, and the coating thereafter applied to furnish a dry residue. In other cases the milled mixture may be calendered on the support.

Where the composite heating panel 5 is adapted for heating the rooms of a dwelling by radiation, it is desirable to have a large percentage of the surface heated, in order to obtain high efficiency and not to have excessive operating temperatures in the composition; for example, temperatures below the boiling point of water (212 degrees Fahrenheit) are advisable. It is also desirable that the composition material 11 have a high electrical conductivity in order to reduce the necessary thickness of the film, thereby decreasing the amount and cost of material that need be applied to the panel. The material 11 may be used in any part of the room, as in side wall panels and/or ceiling panels, or the walls themselves may be painted with the composition, the walls providing suitable supports for electrical connections 6 and 8 to the coating composition 11. It is desirable to heat only the interior of the rooms and not the entire thickness of the walls thereof. The suitable exterior paint 12 may be applied over the electrically conducting coating 11 after it has been dried or is in a dry condition.

It is preferred that the percentage of the conducting black be within the range of 25 per cent. to 50 per cent., based on the dry weight of the composition.

The term "rubber" herein is to be construed broadly as including a natural rubber such as caoutchouc, gutta percha, balata, reclaimed rubber, as well as artificial rubber such as neoprene, etc.

While we have shown a preferred application of our invention, it is to be understood that other modifications may be resorted to without departing from the spirit of the invention or the scope of the appended claims.

Having thus shown and described our invention, what we claim and desire to protect by Letters Patent is:

1. A wall adapted for radiant heating, having a coating of electrically conducting composition containing a binder of the nature of rubber and containing from 25 to 50 percent by weight of conducting carbon black, and means for connecting a source of electrical energy thereto, whereby in use electrical energy is directly converted into heat energy within the film composition, and which, in turn, is radiated, in part, in the form of radiant heat.

2. A wall adapted for radiant heating, having a coating of electrically conducting composition containing a binder of the nature of rubber and containing from 25 to 50 percent by weight of conducting carbon black, said film to have an electrical resistivity in the range from 0.1 to 1.0 ohm-centimeter, and means for connecting a source of electrical energy thereto, whereby in use electrical energy is directly converted into heat energy within the film composition, and which, in turn, is radiated, in part, in the form of radiant heat.

3. A wall having a coating of electrically conducting composition containing a relatively non-cracking flexible binder of the nature of rubber and containing from 25 to 50 percent by weight of thermal acetylene black, said film to have an electrical resistivity in the range from 0.1 to 1.0 ohm-centimeter, and a thickness of about .0001 to 0.01 inch, and means for connecting a source of electrical energy thereto, whereby in use electrical energy is adapted to be directly converted into substantial and useful amounts of heat energy within the film composition, and which, in turn, is radiated, in part, in the form of radiant heat.

4. A heating surface adapted to liberate substantial and useful amounts of heat consisting of an electrically conducting continuous film or layer comprising finely divided electrically conducting carbon black and a relatively non-electrically-conducting flexible binder therefor, said film or layer having an electrical resistivity in the range from 0.1 to 1.0 ohm cms., and means for completing an electrical circuit with said film or layer including separated metal conductors of different polarity contacting said film or layer along a substantial length of said film whereby in use to distribute electrical energy over a comparatively wide area of said film or layer for conversion into thermal energy in said film or layer.

5. A heating surface adapted to liberate substantial and useful amounts of heat consisting of an electrically conducting continuous film or layer comprising finely divided electrically conducting carbon black and a relatively non-electrically-conducting rubbery binder therefor, said film or layer having an electrical resistivity in the range from 0.1 to 1.0 ohm cms., and means for completing an electrical circuit with said film or layer including separated metal conductors of different polarity contacting said film or layer along a substantial length of said film whereby in use to distribute electrical energy over a comparatively wide area of said film or layer, and a substantially non-conducting support for said film or layer.

6. An electrical heating means comprising a relatively non-inflammable heat-insulating, electrically non-conducting support carrying a substantially continuous flexible, substantially non-cracking coating of electrically conductive plastic composition containing electro-conducting carbon in amount capable of liberating substantial and useful amounts of heat energy when generated therein by conversion of electrical energy, and means for completing an electrical circuit with said coating including spaced metal conductors of different polarity contacting said coating along a substantial length thereof whereby to distribute electrical energy over a comparatively wide area of said coating for conversion therein into thermal energy.

7. An electrical heating means comprising a supporting sheet of textile material carrying a substantially continuous flexible electrically conducting coating comprising finely divided electrically conducting carbon black of not more than about 0.25 ohm centimeter resistivity when the black per se is compressed to 2500 lbs. per square inch, and a flexible relatively non-conducting binder for the carbon black, said coating being capable of liberating heat energy when generated therein by conversion of electrical energy, and means for completing an electrical circuit with said coating including spaced metal conductors of different polarity contacting said coating along a substantial length thereof whereby to distribute electrical energy over a comparatively wide area of said coating for conversion therein into thermal energy.

8. An electrical heating means comprising a supporting sheet of textile material carrying a flexible coating of electrically conductive rubber composition containing acetylene carbon black particles in amount sufficient to make the coating electrically conductive and of sufficient electrical resistance to liberate substantial and useful amounts of heat energy when electric current of different polarity is supplied to a comparatively wide area of the coating, and relatively widely spaced metal conductors engaging the coating along a substantial length thereof whereby to distribute electrical energy over a comparatively wide area of said coating for conversion therein into thermal energy.

9. A building wall having a heat-generating electro-conductive coating of relatively uniform thickness and wide surface area comprising finely divided electro-conducting carbon black mixed with a relatively non-conductive plastic binder therefor, the black being present in an amount sufficient to make the coating electrically-conductive and of sufficient electrical resistance to liberate substantial and useful amounts of heat when household current is supplied to a comparatively wide area of the coating, and relatively widely spaced electrical conductors, each adapted to be connected to a source of electrical energy to form a complete electrical circuit, said conductors engaging said coating along a substantial length thereof, whereby, in use, to distribute electrical energy over a comparatively wide area of said coating for generating heat in said coating.

10. A building wall having a heat-generating electro-conductive coating of relatively uniform thickness and wide surface area comprising finely divided thermal acetylene black in admixture with a relatively non-conductive plastic binder therefor, the black being present in an amount sufficient to make the coating electrically-conductive and of sufficient electrical resistance to liberate substantial and useful amounts of heat when household current is supplied to a comparatively wide area of the coating, and relatively widely spaced electrical conductors, each adapted to be connected to a source of electrical energy to form a complete electrical circuit, said conductors engaging said coating along a substantial length thereof, whereby, in use, to distribute electrical energy over a comparatively wide area of said coating for generating heat in said coating.

ARTHUR W. BULL.
GLENN G. HAVENS.

CERTIFICATE OF CORRECTION.

Patent No. 2,314,766.  March 23, 1943.

ARTHUR W. BULL, ET AL.

It is hereby certified that error appears in the printed specification of the above numbered patent requiring correction as follows: Page 3, first column, line 3, claim 3, for "cracking" read --conductive,--; and that the said Letters Patent should be read with this correction therein that the same may conform to the record of the case in the Patent Office.

Signed and sealed this 18th day of January, A. D. 1944.

Henry Van Arsdale,
Acting Commissioner of Patents.

(Seal)